(12) United States Patent
Otsuki et al.

(10) Patent No.: US 6,419,757 B2
(45) Date of Patent: *Jul. 16, 2002

(54) METHOD FOR CLEANING SINTERED SILICON CARBIDE IN WET CONDITION

(75) Inventors: Masashi Otsuki, Musashimurayama; Hiroaki Wada, Kawasaki, both of (JP)

(73) Assignee: Bridgestone, Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/449,764

(22) Filed: Nov. 26, 1999

(30) Foreign Application Priority Data

Dec. 8, 1998 (JP) .......................................... 10-348700
Dec. 8, 1998 (JP) .......................................... 10-348701

(51) Int. Cl.⁷ ................................ B08B 3/04; B08B 7/04
(52) U.S. Cl. ............................. 134/26; 134/1; 134/1.3; 134/2; 134/3; 134/27; 134/28; 134/29
(58) Field of Search .............................. 501/88, 89, 90; 134/1, 1.3, 2, 3, 26, 27, 28, 29

(56) References Cited

U.S. PATENT DOCUMENTS 5,589,116 A * 12/1996 Kojima et al.
5,770,324 A * 6/1998 Holmes et al. ............... 501/88
5,942,454 A * 8/1999 Nakayama et al. ........... 501/88

FOREIGN PATENT DOCUMENTS

| JP | 55-158622 | | 12/1980 |
| JP | 60-138913 | | 7/1985 |
| JP | 64-72964 | | 5/1989 |
| JP | 2-116678 | * | 5/1990 |
| JP | 3-146470 | * | 6/1991 |
| JP | 5-17229 | | 1/1993 |
| JP | 6-77310 | | 3/1994 |
| JP | 8-151267 | * | 6/1996 |
| JP | 9-48605 | | 2/1997 |
| JP | 10-67565 | | 3/1998 |

OTHER PUBLICATIONS

Kern, Handbook of Semiconductor Wafer Cleaning Technology, Noyes Publications, pp. 77–78, 1993.*

* cited by examiner

Primary Examiner—Alexander Markoff
(74) Attorney, Agent, or Firm—Oliff & Berridge, PLC

(57) ABSTRACT

A sintered silicon carbide has a high density and only small amounts of organic and inorganic impurities on the surface and in the vicinity of the surface, i.e., a density of 2.9 g/cm² or more and an amount of each impurity smaller than $1.0 \times 10^{11}$ atoms/cm² on the surface and in the vicinity of the surface. A method for cleaning sintered silicon carbide in a wet condition comprises treating sintered silicon carbide in a step of dipping into a quasi-aqueous organic solvent, a step of dipping into an aqueous solution of an ammonium compound, a step of dipping into an aqueous solution of an inorganic acid and a step of dipping into pure water. Organic and inorganic impurities present on the surface and in the vicinity of the surface of the sintered silicon carbide are removed easily in accordance with the method.

20 Claims, No Drawings

METHOD FOR CLEANING SINTERED SILICON CARBIDE IN WET CONDITION

BACKGROUND OF THE INVENTION

1. Field of the Invention

The present invention relates to a sintered silicon carbide which can be applied to various parts of semiconductors and to electronic parts. More particularly, the present invention relates to a sintered silicon carbide which has a high purity, a high density and to whose surface and vicinity thereof only small amounts of organic contaminants, metal element contaminants and particle contaminants attach, and which can be used for dummy wafers, targets, heating elements and the like. The present invention also relates to a method for removing organic contaminants, metal element contaminants and particle contaminants from a sintered silicon carbide which is used for dummy wafers, targets, heating elements, which is parts of semiconductors or electronic parts, and which is required to have a high density and a high purity.

2. Description of the Related Art

Silicon carbide, particularly sintered silicon carbide, is a strongly covalently bonded compound and has heretofore been used in various fields by taking advantage of excellent properties such as excellent strength at high temperatures, heat resistance, wear resistance, chemical resistance and the like. These advantageous properties have attracted attention, and recently expectations have been placed on application in the fields of electronics, information and semiconductors.

As the degree of integration in semiconductor integrated circuits using silicon substrate increases and the line width of the circuits becomes smaller, various parts of semiconductors and electronic parts used in those fields are required to have a higher purity and a higher density. Therefore, methods of hot press sintering using nonmetallic auxiliary sintering agents and methods of reaction sintering have been intensively researched. However, the surface and the vicinity of the surface of sintered silicon carbide obtained in accordance with these sintering methods become contaminated during processes before, during and after the sintering such as sintering, working and handling, although the sintered silicon carbide has a high purity and a high density.

Therefore, to apply a sintered silicon carbide to various parts of semiconductors and electronic parts, i.e., to prevent contaminations of surfaces including particle, it is essential that the surface be cleaned and a purity of the surface as high as that of silicon wafers be achieved. However, no sintered silicon carbide having a satisfactory purity on the surface have actually been obtained.

Disclosed methods of cleaning a sintered silicon carbide are as follows: (1) a sintered silicon carbide is cleaned with an acid, treated by oxidation at 1,200° C. or higher and is thereafter surface-treated in an atmosphere of nitrogen; (2) in a method disclosed in Japanese Patent Application Laid-Open (JP-A) No. 5-17229, a sintered silicon carbide is cleaned by blasting with a silica abrasive grain and is then cleaned in a wet condition with a mixed acid containing hydrofluoric acid and nitric acid; (3) in a method disclosed in JP-A No. 6-77310, a sintered silicon carbide is cleaned by dipping into an aqueous solution of hydrofluoric acid, rinsed with ultrapure water, cleaned with oxygen and a halogen gas in a dry condition and is then treated with oxygen; and (4) in methods disclosed in JP-A Nos. 55-158622, 60-138913 and 64-72964, porous silicon carbide is cleaned with a gas of a hydrogen halide and an inorganic acid to increase the purity and then the purified silicon carbide is subjected to secondary sintering because purification to a high degree is very difficult after the sintering has been conducted.

The above methods have a drawback in that additional treatments such as oxidation, blast cleaning and secondary sintering is required in addition to simple cleaning in the wet condition and therefore the processes become complicated. These methods cannot be considered to be satisfactory as cleaning methods.

SUMMARY OF THE INVENTION

The present invention is based on the above circumstances and an object of the present invention is to provide a sintered silicon carbide having a high density and containing only small amounts of organic and inorganic impurities on the surface and in the vicinity of the surface.

Another object of the present invention is to provide a method for easily cleaning a sintered silicon carbide in a wet condition to remove organic and inorganic impurities present on the surface and in the vicinity of the surface of the sintered silicon carbide so that the sintered silicon carbide can be applied to various parts of semiconductors and electronic parts.

In the intensive research carried out by the present inventors to achieve the above objects, the present inventors focused their attention on the fact that, even when a sintered silicon carbide having a high density and a high purity which can be applied to various parts of semiconductors and electronic parts is obtained, the concentrations of organic and inorganic impurities on the surface and in oxide layers increase by contamination of the obtained sintered silicon carbide in succeeding steps, and the present invention was achieved thereby.

In the first aspect of the present invention, a sintered silicon carbide having a total amount of impurity present on a surface and in a vicinity of the surface of the sintered silicon carbide less than $1.0 \times 10^{11}$ atoms/cm$^2$ and a density greater than 2.9 g/cm$^2$, is provided.

In a second aspect of the present invention, a sintered silicon carbide having a total amount of impurity present on a surface and in a vicinity of the surface of the sintered silicon carbide less than $1.0 \times 10^{11}$ atoms/cm$^2$ and a density greater than 2.9 g/cm$^2$, formed by a process comprising the steps of: sintering in which a mixture of silicon carbide powder and a nonmetallic auxiliary sintering agent is hot pressed at a temperature of 2,000 to 2,400° C. and at a pressure of 300 to 700 kgf/cm$^2$ in a nonoxidizing atmosphere; and a step of cleaning in which the sintered silicon carbide obtained after the step of sintering is cleaned in a wet condition, is provided.

In a third aspect of the present invention, a method for cleaning a sintered silicon carbide in a wet condition, comprising the steps of: dipping the sintered silicon carbide into a quasi-aqueous organic solvent; and then dipping the sintered silicon carbide into an aqueous solution of an inorganic acid; and thereafter dipping the sintered silicon carbide into pure water, is provided.

In a fourth aspect of the present invention, a method for cleaning a sintered silicon carbide in a wet condition, comprising the steps of: dipping the sintered silicon carbide into a quasi-aqueous aqueous organic solvent; and then dipping into an aqueous solution of an ammonium compound; followed by dipping the sintered silicon carbide into an aqueous solution of an inorganic acid; and thereafter dipping into pure water, is provided.

In a fifth aspect of the present invention, a method for cleaning a sintered silicon carbide in a wet condition, comprising the steps of: dipping the sintered silicon carbide into a quasi-aqueous organic solvent; and then dipping the sintered silicon carbide into an aqueous solution of an inorganic acid; followed by dipping the sintered silicon carbide into an aqueous solution of an ammonium compound; and thereafter dipping the sintered silicon carbide into pure water, is provided.

DESCRIPTION OF THE PREFERRED EMBODIMENTS

In a sintered silicon carbide of the present invention, a total amount of an impurity present on a surface and in the vicinity of the surface (occasionally referred to as the surface cleanliness, hereinafter) is less than $1.0 \times 10^{11}$ atoms/$cm^2$, preferably less than $5.0 \times 10^{10}$ atoms/$cm^2$ and more preferably less than $1.0 \times 10^{10}$ atoms/$cm^2$. When the amount of an impurity exceeds $1.0 \times 10^{11}$ atoms/$cm^2$, contamination such as contamination, particle and the like take place due to impurities present on the surface and in the vicinity of the surface. In the present invention, "the amount of an impurity" present on the surface and in the vicinity of the surface means the amount of each impurity element. "An impurity" means substantially any element other than Si, C, O, N, halogens and rare gases. "The surface and the vicinity of the surface" means the outermost surface of a substrate of a sintered silicon carbide and a spontaneous oxide layer formed on the outermost surface. The spontaneous oxide layer formed on the outermost surface is a layer of $SiO_2$ and generally has a thickness of about 40 to 60 nm (TAKEO SASAKI, Yogyo Kyokaishi, Volume 95, page 84 (1987)).

The amount of an impurity present on the surface and in the vicinity of the surface described above is measured in accordance with the analysis using an ICP-MS (Inductively Coupled Plasma Mass Spectrometer) or a TXRF (Total Reflection X-ray Fluorescencemeter). The analyses using an ICP-MS and a TXRF give approximately the same results.

The sintered silicon carbide of the present invention has a density of 2.9 g/$cm^3$ or more and preferably 3.0 g/$cm^3$ or more. When the density is less than 2.9 g/$cm^3$, mechanical properties, such as bending strength and breaking strength, and electrical properties deteriorate and particle contamination is caused since the amount of particles increases.

In the sintered silicon carbide of the present invention, the total content of impurities is preferably 10 ppm or less and more preferably 5 ppm or less. When the total content of impurities exceeds 10 ppm, impurities tend to diffuse during use at a high temperature and there is the possibility of the surface of semiconductive silicon becoming contaminated to cause invention failure due to leaking at the p-n junction, for example. In the present invention, the total content of impurities in the sintered silicon carbide does not include the amounts of impurities on the surface and in the vicinity of the surface.

The sintered silicon carbide of the present invention and the method for producing the sintered silicon carbide of the present invention will be described in the following.

The sintered silicon carbide of the present invention may be obtained in accordance with a method comprising a step of producing a sintered silicon carbide and a step of cleaning the sintered silicon carbide in a wet condition.

The step of producing a sintered silicon carbide will be described in more detail hereinafter.

The step of producing a sintered silicon carbide comprises a step of sintering in which a mixture of silicon carbide powder and a nonmetallic auxiliary sintering agent is hot pressed at a temperature of 2,000 to 2,400° C. at a pressure of 300 to 700 kgf/$cm^2$ in a nonoxidizing atmosphere (occasionally referred to as a step of sintering, hereinafter).

It is preferable that the silicon carbide powder is obtained in a step in which a silicon source containing one or more types of liquid silicon compound, a carbon source containing one or more types of liquid organic compound and a polymerization catalyst or a crosslinking catalyst are uniformly mixed together and the obtained solid material is baked in a nonoxidizing atmosphere to produce silicon carbide powder (occasionally referred to as a step of preparation of silicon carbide powder, hereinafter).

The sintered silicon carbide of the present invention may contain nitrogen. Nitrogen can be introduced into the sintered silicon carbide in accordance with a method in which one or more types of nitrogen source (occasionally referred to as a nitrogen source, hereinafter) are added in combination with a carbon source and a silicon source in the step of preparation of silicon carbide powder described above or in accordance with a method in which the nitrogen source is added in combination with the nonmetallic auxiliary sintering agent in the step of sintering.

As a substance used as the nitrogen source, substances generating nitrogen in the presence of heat are preferable. Examples of such substances include polyimide resins, precursors of polyimide resins and various types of amines such as hexamethylenetetramine, ammonia and triethylamine.

When the nitrogen source is added in combination with the silicon source in the step of preparation of the silicon carbide powder described above, the amount of the nitrogen source is 80 to 1,000 μg per 1 g of the carbon source. When the nitrogen source is added in combination with the nonmetallic auxiliary sintering agent in the step of sintering described above, the amount of the nitrogen source is 200 to 2,000 μg and preferably 1,500 to 2,000 μg per 1 g of the nonmetallic auxiliary sintering agent.

The silicon carbide powder and the step of preparation of the silicon carbide powder will be described in the following.

The silicon carbide powder described above may be a powder of (α-type silicon carbide, β-type silicon carbide, amorphous silicon carbide, or silicon carbide which is a mixture of these types. A powder of β-type silicon carbide is particularly preferably used. In the sintered silicon carbide of the present invention, preferably 70% or more and further preferably 80% or more of the total silicon carbide components is β-silicon carbide, and 100% of the total silicon carbide components may be β-silicon carbide. Therefore, preferably 60% or more and further preferably 65% or more of the silicon carbide powder used as raw material is β-silicon carbide.

The grade of the powder of β-type silicon carbide is not particularly limited and, for example, a commercially available powder of β-type silicon carbide can be used. To obtain a sintered silicon carbide having a high density, it is preferable that silicon carbide powder has a small particle diameter. The particle diameter is preferably about 0.01 to 10 μm, and more preferably about 0.05 to 1 μm. When the particle diameter is less than 0.01 μm, handling in the steps of measuring and mixing becomes difficult. When the particle diameter exceeds 10 μm, the specific surface area of the powder becomes small, i.e., the contact surface area between the particles becomes small and obtaining a sintered silicon carbide having a high density becomes difficult. Therefore, such particle diameters are not preferable.

As the preferable embodiment of the silicon carbide powder described above, a silicon carbide powder having a particle diameter of 0.05 to 1 µm, a specific surface area of 5 m²/g or more, a content of free carbon of 1% or less and a content of oxygen of 1% or less is preferably used. The distribution of the particle size of the silicon carbide powder is not particularly limited. The distribution of the particle size may have two peaks from the standpoint of increasing the packing density of particles and from the standpoint of the reactivity of silicon carbide during the preparation of the sintered silicon carbide.

To obtain a sintered silicon carbide having a high purity, a silicon carbide powder having a high purity is used as the raw material.

The silicon carbide powder having a high purity can be obtained, for example, in accordance with a process comprising: a step which comprises solidifying a mixture obtained by uniformly mixing a silicon source containing at least one liquid silicon compound, a carbon source containing at least one liquid organic compound which generates carbon in the presence of heat, a polymerization or crosslinking catalyst and, where desired, a nitrogen source to obtain a solid material; and a step of sintering the resulting solid material in a nonoxidizing atmosphere (these steps occasionally referred to as the step of preparation of a silicon carbide powder, hereinafter).

The silicon source containing the silicon compound described above (occasionally referred to as the silicon source, hereinafter) may be a combination of liquid silicon compounds and solid silicon compounds. However, at least one compound selected from liquid silicon compounds should be included. A mono-, di-, tri-, or tetraalkoxysilane or a polymer of a tetraalkoxysilane can be used as the liquid silicon compound. Among these alkoxysilanes, tetraalkoxysilanes are preferable. Specific examples of the tetraalkoxysilane include tetramethoxysilane, tetraethoxysilane, tetrapropoxysilane, and tetrabutoxysilane. Tetraethoxysilane is more preferable from the standpoint of handling. Examples of the polymer of a tetraalkoxysilane include polymers having a low degree of polymerization of about 2 to 15 (oligomers) and liquid polymers of silicic acid having a higher degree of polymerization. Examples of the solid silicon compound which is used in combination with the liquid silicon compound include silicon oxides. In the present invention, the silicon oxide includes, in addition to SiO, silica sol (such as fluids containing extremely fine colloidal silica which contains hydroxyl group and/or alkoxyl groups therein), silicon dioxide (such as silica gel, fine silica, and powder of quartz) and the like.

Among the silicon sources described above, oligomers of tetraethoxysilane and mixtures of an oligomer of tetraethoxysilane and a fine powder of silica are preferable from the standpoint of better uniformity and handling. Substances having a high purity are used as the silicon source. The original content of impurities in the silicon source is preferably 20 ppm or less and more preferably 5 ppm or less.

The carbon source described above containing the organic compound which generates carbon in the presence of heat (occasionally referred to as the carbon source, hereinafter) may be a liquid compound or a combination of a liquid compound and a solid compound. As the carbon source, the organic compound which provide a large amount of residual carbon and are polymerized or crosslinked in the presence of a catalyst or heat are preferable. Preferable examples of the organic compound include monomers and prepolymers of resins such as phenol resins, furan resins, polyimides, polyurethanes, and polyvinyl alcohol as well as liquid materials such as cellulose, cane sugar, pitch, tar and the like.

Among these organic compounds, phenol resins of the resol type are particularly preferable. The purity of the organic compound can suitably be controlled or selected in accordance with the purpose. When a silicon carbide powder having a particularly high purity is required, it is preferable that an organic compound which does not contain 5 ppm or more of any metal is used.

In the production of the silicon carbide powder having a high purity described above, the ratio of carbon to silicon (abbreviated hereinafter as C/Si ratio) is defined in accordance with the result of elemental analysis of an intermediate product obtained by carbonization of the mixture at 1,000° C. From the stoichiometry of the reaction, the content of free carbon in the formed silicon carbide should be 0% when the C/Si ratio is 3.0. However, in actuality, free carbon is formed at a lower C/Si ratio because SiO gas formed simultaneously during the reaction is removed. It is important that the mixing ratio be decided in advance in a manner such that free carbon is not formed in the silicon carbide powder in an amount which adversely affects the use of the sintered silicon carbide. In general, the formation of free carbon can be suppressed in baking at 1600° C. or higher at a pressure of about 1 atm when the C/Si ratio is 2.0 to 2.5. When the C/Si ratio is 2.5 or more, the amount of free carbon markedly increases. Therefore, the C/Si ratio of 2.0 to 2.5 is preferable. However, a C/Si ratio of 2.5 or more may suitably be used depending on the purpose of forming particles having objective particle size because free carbon shows an effect of suppressing growth of grains. When the pressure of the atmosphere in the baking is higher or lower, a different value of the C/Si ratio may be suitable for obtaining a silicon carbide having a high purity. Therefore, the C/Si ratio is not necessarily limited to the above range of 2.0 to 2.5 in this case.

The effect of the free carbon obtained during the step of sintering is much smaller than the effect of the carbon derived from the nonmetallic auxiliary sintering agent covering the entire surface of the silicon carbide powder, which will be described later. Therefore, the effect of the free carbon is essentially negligible.

A mixture of the silicon source described above and the carbon source described above may be hardened into a solid mixture to obtain a solid material in which the silicon source and the carbon source are uniformly mixed together. Examples of the method of hardening include crosslinking by heating, hardening in the presence of a hardening catalyst, and methods using electronic beams or irradiation. The hardening catalyst can be suitably selected in accordance with the carbon source. When a phenol resin or a furan resin is used as the carbon source, acids such as toluenesulfonic acid, toluenecarboxylic acid, acetic acid, oxalic acid, hydrochloric acid, sulfuric acid, and maleic acid, and amines such as hexamine can be used.

If necessary, carbonization of the solid mixture is conducted by heating the solid material in a nonoxidizing atmosphere, such as an atmosphere of nitrogen or argon, at 800 to 1,000° C. for 30 to 120 minutes.

Silicon carbide is formed by heating the solid mixture, which has been carbonized by heating, in a nonoxidizing atmosphere, such as an atmosphere of argon, at 1,350° C. or higher and 2,000° C. or lower. The temperature and the time of the baking can suitably be selected in accordance with the desired property of the sintered material, such as the particle diameter. Baking at 1,600 to 1,900° C. is preferable to achieve effective formation of silicon carbide.

To achieve a still higher purity than the above powder having a high purity, a further heat treatment is conducted at 2,000 to 2,100° C. for 5 to 20 minutes during the above baking.

As a process for producing a silicon carbide powder having a particularly high purity, there can be used the process for producing a material powder described in the specification of JP-A Nos. 9-48605 as a process for producing single crystals. This process comprises a step of forming a silicon carbide powder and an after-treatment step. In the step of forming the silicon carbide powder, a silicon source and a carbon source are uniformly mixed to prepare a mixture, and the mixture is baked by heating in a nonoxidizing atmosphere to obtain a silicon carbide powder. The silicon source is at least one compound selected from high-purity tetraalkoxysilanes and high-purity polymers of tetraalkoxysilanes, and the carbon source is a high-purity organic compound which generates carbon in the presence of heat. In the after-treatment step, the silicon carbide powder is kept at a temperature of 1,700° C. or higher and lower than 2,000° C. and, while the temperature is essentially kept in this range, the powder is treated by heating at 2,000° C. to 2,100° C. for 5 to 20 minutes at least once. A high purity silicon carbide powder containing 0.5 ppm or less of each impurity can be obtained in accordance with this process comprising the above two steps.

The step of sintering described above will be described more specifically in the following.

In the step of sintering, a mixture of the silicon carbide powder, the nonmetallic auxiliary sintering agent and, where desired, the nitrogen source (occasionally referred to as a mixture of silicon carbide powder) is sintered by hot pressing at a temperature of 2,000 to 2,400° C. at a pressure of 300 to 700 kgf/cm² in a nonoxidizing atmosphere.

In the step of sintering, a substance which generates carbon in the presence of heat is used as the nonmetallic auxiliary sintering agent described above. Examples of the above substance include organic compounds which generate carbon in the presence of heat and powders of silicon carbide covered with these organic compounds on the surface thereof (particle diameter: about 0.01 to 1 μm). Among these substances, the former is preferable from the standpoint of the effects achieved.

Specific examples of the organic compound which generates carbon in the presence of heat include coal tar pitch containing a large amount of residual carbon, pitch tar, phenol resins, furan resins, epoxy resins, phenoxy resins, and various types of sugar, such as monosaccharides such as glucose, oligosaccharides such as sucrose, and polysaccharides such as cellulose and starch. Among these substances, substances which are liquid at room temperature, substances which are soluble into a solvent, or substances which are softened or turned into a liquid by heating, for example, substances which are thermoplastic or heat melting substances, are preferable for achieving uniform mixing with the silicon carbide powder. Phenol resins, particularly phenol resins of the resol type, are more preferable because of the high strengths of molded products.

The above organic compound which generates carbon in the presence of heat functions as the auxiliary sintering agent effectively, since inorganic carbon compounds such as carbon black and graphite (which were generated from the organic compound which generates carbon) are formed on the surface or in the vicinity of the surface of silicon carbide in the presence of heat, and therefore an oxide layer covered on the surface is efficiently removed during the sintering.

It is preferable that the nonmetallic auxiliary sintering agent described above is dissolved or dispersed in a solvent, and the prepared solution or dispersion is used to prepare the mixture of the silicon carbide powder and the nonmetallic auxiliary sintering agent. The solvent is suitably selected in accordance with the compound used as the nonmetallic auxiliary sintering agent. Specifically, lower alcohols such as ethyl alcohol, an ethyl ether, acetone or the like can be used for a phenol resin which is preferable as the organic compound which generates carbon in the presence of heat. It is also preferable that the used nonmetallic auxiliary sintering agent and the used solvent contain small amounts of impurities.

A considerably small amount of the nonmetallic auxiliary sintering agent in the mixture leads to a low density of the sintered material. On the other hand, a considerably large amount tends to inhibit an increase in the density because of the increase in free carbon contained in the sintered material. The amount of the nonmetallic auxiliary sintering agent is generally 10% by weight or less, preferably 2 to 5% by weight, although the amount differs in accordance with the type of the nonmetallic auxiliary sintering agent. This amount of the agent can be decided by determining the amount of silica (silicon oxide) on the surface of the silicon carbide powder by using hydrofluoric acid, followed by stoichiometrically calculating the amount sufficient to reduce the silica.

The silica in the amount determined above is reduced with carbon derived from the nonmetallic auxiliary sintering agent according to the following chemical reaction:

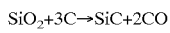

$$SiO_2 + 3C \rightarrow SiC + 2CO$$

The amount of carbon to be added described above is determined by taking the residual carbon ratio (the percentage of the nonmetallic auxiliary sintering agent converted into carbon) after thermal decomposition of the nonmetallic auxiliary sintering agent into consideration.

In the sintered silicon carbide described above, it is preferable that the total content of carbon atoms derived from silicon carbide and carbon atoms derived from the nonmetallic auxiliary sintering agent exceeds 30% by weight and is less than or equal to 40% by weight. When the total content is 30% by weight or less, relative amounts of impurities contained in the sintered material increase. When the total content exceeds 40% by weight, the density of the sintered material decreases, and thus properties such as strengths and oxidation resistance of the sintered material deteriorate due to the excessively large content of carbon.

To produce the sintered material of silicon carbide described above, the silicon carbide powder and the nonmetallic auxiliary sintering agent are uniformly mixed together. As described above, a phenol resin used as the nonmetallic auxiliary sintering agent is dissolved into a solvent, such as ethyl alcohol, and then mixed with the silicon carbide powder sufficiently. In case where the nitrogen source is added in accordance with desire, the nitrogen source can be added in combination with the nonmetallic auxiliary sintering agent.

The mixing described above can be conducted by a conventional method, such as a method using a mixer or a planetary ball mill. The mixing is conducted preferably for 10 to 30 hours, more preferably for 16 to 24 hours. After sufficient mixing has been achieved, the solvent is removed at a temperature suitable for the solvent, for example at 50 to 60° C. when ethyl alcohol is used as described above, until the mixture is dried, and the resulting mixture is sieved with a sieve to obtain a powder of the mixture which is used as the raw material powder. From the standpoint of achieving a high purity, the container and the balls of the ball mill may be made of a synthetic resin which does not contain metals. A granulating machine, such as a spray drier, may be used for drying.

In the step of sintering described above, it is preferable that the mixture of the powder or a molded product made of the mixture of the powder obtained in the molding step described below is placed in a mold and hot pressed at a temperature of 2,000 to 2,400° C. at a pressure of 300 to 700 kgf/cm² in a nonoxidizing atmosphere.

As for the mold mentioned above, it is preferable from the standpoint of the purity of the sintered material that a portion of the mold or the entire mold is made of a material such as graphite, or that Teflon sheets or the like are placed inside the mold, so that the mixture of the powder or the molded product made of the mixture of the powder do not directly contact metallic portions of the mold.

In the present invention, the pressure of the hot pressing can be in the range of 300 to 700 kgf/cm². Particularly at pressures of 400 kgf/cm² or more, parts used for the hot pressing such as dies and punches, should be parts having good pressure resistance.

It is preferable that, before the hot pressing step is conducted to prepare the sintered material, impurities are sufficiently removed by heating under the following conditions and complete carbonization of the nonmetallic auxiliary sintering agent is achieved, and that hot pressing is then carried out under the conditions described above.

It is preferable that the heating described above is conducted by two-step heating in two steps, i.e., a first heating-and temperature raising-step and a second heating-and temperature raising-step as follows.

In the first heating-and temperature raising-step, a furnace is evacuated and slowly heated from room temperature to 700° C. When it is difficult to control the temperature in the furnace, the temperature may be increased continuously to 700° C. in a single step. However, it is preferable that, after the pressure in the furnace is adjusted to $10^{-4}$ Torr, the temperature is slowly increased from room temperature to 200° C., maintained at this temperature, then increased slowly to 700° C., and maintained at about 700° C. In this first heating-and temperature raising-step, absorbed water and the organic solvent are removed, and carbonization proceeds through the thermal decomposition of the nonmetallic auxiliary sintering agent. The period of time over which the temperature is maintained at about 200° C. or 700° C. is selected in a suitable range which depends on the size of the sintered material. A sufficient period of time can be determined on the basis of when a decrease in the vacuum is reduced a certain extend. If the temperature is raised before the sufficient period of the time has elapsed, removal of impurities and carbonization of the carbon source do not proceed sufficiently, and thus there is the possibility that cracks and pores are formed in the molded product.

In the first heating- and temperature raising-step, for example, the following procedures are carried out for a sample of 5 to 10 g. After the pressure is adjusted to $10^{-4}$ Torr, the temperature is slowly increased from room temperature to 200° C., maintained at this temperature for about 30 minutes, and then slowly continued to be raised until the temperature reaches 700° C. The period of time required to raise the temperature from room temperature to 700° C. is about 6 to 10 hours, preferably about 8 hours. It is preferable that the temperature is maintained at about 700° C. for 2 to 5 hours.

In the second heating-and temperature raising-step, the temperature is further raised from 700° C. to 1,500° C. in vacuo over 6 to 9 hours for the same sample as described above. The temperature is maintained at 1,500° C. for about 1 to 5 hours. It is believed that silicon dioxide and silicon oxide are reduced in this step. To completely remove the oxygen bonded to the silicon, it is important that this reduction reaction be allowed to proceed completely. Therefore, it is important that the temperature be maintained at 1,500° C. for a period of time sufficient to completely generate carbon monoxide which is formed as a byproduct of the reduction reaction. In other words, the temperature should be maintained at 1,500° C. until the decrease in the vacuum becomes small, and the pressure value returns to the value observed before the start of the reduction, i.e., the value at the time when the temperature was about 1,300° C. By the reduction in the second heating-and temperature raising-step, the silicon dioxide, which is attached to the surface of the powdered silicon carbide and which adversely affects the increasing of the density and which causes formation of larger particles, can be removed. The gas containing SiO and/or CO, which is generated in the reduction step, contains impurity elements. This gas is continuously discharged and removed from the reaction furnace by a vacuum pump. Therefore, preferably, the temperature is sufficiently maintained at the above value from the standpoint of producing a sintered material having a high purity.

It is preferable that the hot pressing is conducted at a high pressure after the above steps of heating have been completed. When the temperature is raised above 1,500° C., the sintering starts. At this time, the pressure is increased up to about 300 to 700 kgf/cm² to suppress abnormal growth of particles. Subsequently, an inert gas is introduced into the furnace to achieve a nonoxidizing atmosphere. Nitrogen or argon gas can be used as the inert gas, and argon gas is preferable because argon gas is inert even at high temperatures.

To perform the hot pressing described above, the temperature is raised to 2,000 to 2,400° C. and the pressure is increased to 300 to 700 kgf/cm² after the atmosphere inside the furnace has been converted into a nonoxidizing atmosphere. The pressure for the hot pressing can be selected in accordance with the particle diameter of the material powder. When the diameter of the material powder is small, an excellent sintered material can be obtained at a relatively small pressure for the hot pressing. The heating from 1,500° C. to the maximum temperature of 2,000 to 2,400° C. is carried out over 2 to 4 hours. The sintering reaction is accelerated at 1,850 to 1900° C. The temperature is maintained at the maximum temperature for 1 to 3 hours, and then the sintering is completed.

A maximum temperature of 2,000° C. to 2,400° C. leads to the production of a sintered material having a sufficient density. When a maximum temperature is less than 2,000° C., a sintered material can not have a sufficient high density. When a maximum temperature is over than 2,400° C., the powder or the raw material used for the molding tend to sublime or decompose. Therefore, such a maximum temperatures of 2,000° C. to 2,400° C. is preferable. A pressure of 500 kgf/cm² to 700 kgf/cm² leads to the production of a sintered material having a sufficient density, and is preferable from the standpoint of efficiency of production. When the pressure is greater than 700 kgf/cm², the pressure may cause fracturing of the mold such as a mold made of graphite. When the pressure is smaller than 500 kgf/cm², the sintered silicone carbide can not have sufficient high density.

In the hot pressing described above as well, it is preferable that a graphite material having a high purity is used for molds and for heat insulators for the heating furnace used in the process, from the viewpoint of high purity of the obtained sintered material. Therefore, it is preferable to use a graphite material which has been treated to have a high purity in advance. Specifically, it is preferable to use a graphite material which has been sufficiently baked at 2,500° C. or higher in advance, and generates no or few impurities at the temperature of sintering. The inert gas used in the process is preferably a gas of a high purity grade which contains few impurities.

The sintered silicon carbide having excellent properties can be obtained after the step of sintering described above. However, a following molding step may be conducted before the step of sintering to provide the finally obtained sintered material with a higher density. The molding step is described hereinafter. The molding step comprises placing a mixture of the silicon carbide powder into a mold; and heating at a temperature in the range of 80 to 300° C. for 5 to 60 minutes under pressure to prepare a molded material of the mixture of the silicon carbide powder (occasionally referred to as a molded material, hereinafter) in advance. In this procedure, it is preferable that the mixture is packed into the mold as densely as possible from the standpoint of increasing the density of the finally obtained sintered material. In this molding step, a bulky powder can be made compact before the powder is packed for the hot pressing, and the production of a molded product having a large thickness can be facilitated by repeating the molding step.

A molded material made of the mixture of the silicon carbide powder is obtained by pressing the material powder at a temperature in the range of 80 to 300° C. and preferably in the range of 120 to 140° C. at a pressure in the range of 60 to 100 $kgf/cm^2$ in accordance with the properties of the nonmetallic auxiliary sintering agent so that the density of the packed material powder becomes 1.5 $g/cm^3$ or more and preferably 1.9 $g/cm^3$ or more, followed by maintaining the material powder in the compressed condition for 5 to 60 minutes and preferably for 20 to 40 minutes. The smaller the average diameter of the particles is, the more difficult it is to provide a molded material with higher density. It is preferable that a suitable method, such as packing by vibration, is used to achieve a higher density when the powder material is placed into the mold. Specifically, when a powder has an average particle diameter of about 1 $\mu$m, the density is more preferably 1.8 $g/cm^3$ or more, and when a powder has an average particle diameter of about 0.5 $\mu$m, the density is more preferably 1.5 $g/cm^3$ or more. When the density is less than 1.8 $g/cm^3$ in the former case or less than 1.5 $g/cm^3$ in the latter case, it becomes difficult to provide the finally obtained sintered material with a high density.

The molded material described above may be cut to a shape fitting a hot pressing mold in advance before being used in the step of sintering. The molded material, preferably the molded material which has been covered with the nonmetallic auxiliary sintering agent on the surface, is subjected to the step of sintering, in which the molded material is placed in a mold and hot pressed at a temperature of 2,000 to 2,400° C. at a pressure of 300 to 700 $kgf/cm^2$ in a nonoxidizing atmosphere as described above, to obtain a sintered silicon carbide having a high density and a high purity. When the silicon carbide powder and/or the combination of the silicon carbide powder and the nonmetallic auxiliary sintering agent contains at least 500 ppm of the nitrogen component, a sintered silicon carbide can be obtained after sintering, which contains about 200 ppm of nitrogen as a uniform solid solution and has a volume resistivity of 1 $\Omega\cdot$cm or less.

The sintered silicon carbide obtained in accordance with the above method of production has a sufficient density, i.e., a density of 2.9 $g/cm^3$ or more. When a density is less than 2.9 $g/cm^3$, physical properties, such as bending strength and strength at break, and electric properties are lowered, and undesired contaminations take place due to large particles. Therefore, such a density of 2.9 $g/cm^3$ or more is preferable. The density of the sintered silicon carbide is more preferably 3.0 $g/cm^3$ or more.

When the obtained sintered material is porous, the sintered material has drawbacks in that heat resistance, oxidation resistance, chemical resistance and mechanical strength are inferior; that cleaning is difficult; that tiny cracks form and tiny pieces of the material formed from the cracks become contaminating substances; that gases can permeate therethrough; and that application of the sintered silicon carbide is limited as a result of these drawbacks.

The total content of impurities in the sintered silicon carbide described above is 10 ppm or less, preferably 5 ppm or less. However, the content of impurities, which is calculated by chemical analysis, has importance merely as a reference. When the sintered material is actually used in the fields, such as parts of electronic device or semiconductor, the results of evaluation also depend on the distribution of impurities, i.e., whether impurities are distributed uniformly or unevenly. For example, persons skilled in the art generally evaluate the degree of contamination with impurities under prescribed heating conditions in accordance with various methods using apparatuses actually used in production. In accordance with the process described herein comprising carbonizing the solid material obtained by uniformly mixing the liquid silicon compound, the nonmetallic auxiliary sintering agent, and the catalyst for polymerization or crosslinking by heating in a nonoxidizing atmosphere and then sintering the obtained product in a nonoxidizing atmosphere, the total content of impurity elements in the sintered silicon carbide can be reduced to 10 ppm or less. The silicon source and the nonmetallic auxiliary sintering agent, which are used in the above step of preparation of the silicon carbide powder and in the above step of preparation of the sintered silicon carbide from the silicon carbide powder, and the inert gas, which is used to form the nonoxidizing atmosphere, each preferably contains each impurity element in an amount of 10 ppm or less and more preferably 5 ppm or less. However, the amount contained of an impurity is not limited to the above values as long as the amount contained is in a range which allows sufficient purification in the steps of heating and sintering. The impurity elements described above substantially means elements other than Si, C, O, N, halogens and rare gases.

The above sintered silicon carbide obtained by using the nonmetallic auxiliary sintering agent has a high density of 2.9 $g/cm^3$ or more and an advantageous sintered structure which tends to become a polycrystalline semiconductor with excellent electric conductivity. Since conductive electrons transfer between crystals across the grain boundary, the junction of the grain boundary phase and silicon carbide is also important for exhibition of electric conductivity. Transferring properties of conductive electrons are classified into two types, i.e., tunnel conduction and thermally excited conduction.

When the sintered silicon carbide contains nitrogen, the content of nitrogen is preferably 150 ppm or more and more preferably 200 ppm or more. It is preferable that nitrogen is contained as a solid solution from the standpoint of stability.

When a sintered silicon carbide contains 150 ppm or more of nitrogen as a solid solution, the barrier of the space charge layer formed at the grain boundary becomes about 0.15 eV or less, and an excellent conduction can be exhibited. The sintered silicon carbide has a volume resistivity of 1 $\Omega\cdot$cm in this condition. When the silicon carbide contains 200 ppm or more of nitrogen, the barrier of the space charge layer at the grain boundary becomes 0.026 eV or less. Since this barrier can be overcome by thermal excitation even at an ordinary temperature (300K), the thermally excited conduction and the tunnel conduction take place.

It is generally known that volume resistivity of a semiconductor first decreases (the NTC region) and then increases (the PTC region) with an increase in the temperature. The smaller the change in volume resistivity with temperature, the easier the temperature control of the semiconductor used as an electric heating element. As for the sintered silicon carbide, the larger the content of nitrogen as a solid solution, the lower the temperature of the boundary of the NTC region and the PTC region. In other words, when the content of nitrogen is 150 ppm or more and preferably 200 ppm or more as shown in the case of the sintered silicon carbide of the present invention, the NTC region at lower temperatures which exhibits the largest change in volume resistivity with temperature becomes small. Therefore, the change in volume resistivity with temperature decreases in a range from room temperature to a high temperature.

The sintered silicon carbide obtained after the step of producing the sintered silicon carbide described above is worked to have a desired shape, treated by grinding and polishing and thereafter, a step of cleaning is carried out. As the method of working and the treatments of grinding and polishing, conventional methods can be used. When nitrogen is introduced into the sintered silicon carbide, working by electric discharge is preferable as the method of working.

The method (the step) of cleaning a sintered silicon carbide in a wet condition of the present invention will be described in detail in the following.

When the step of cleaning a sintered silicon carbide of the present invention is performed, the sintered silicon carbide having the amount of an impurity present on the surface and in the vicinity of the surface smaller than $1.0 \times 10^{11}$ atoms/$cm^2$, preferably smaller than $5 \times 10^{10}$ atoms/$cm^2$ and more preferably smaller than $1.0 \times 10^{10}$ atoms/$cm^2$ can be obtained easily.

The method for cleaning a sintered silicon carbide in a wet condition of the present invention is applied not only to the sintered silicon carbide described above but also to any sintered silicon carbide having a high density and a high purity which can be used for various parts of semiconductors and electronic parts. For example, the method can be applied to silicon carbides sintered by hot pressing using a nonmetallic auxiliary sintering agent and the sintered silicon carbide described in the specification of Japanese Patent Application No. 10-67565 applied by the present applicant.

In the method for cleaning a sintered silicon carbide in a wet condition of the present invention, since the cleaning liquids are all composed of agents which are soluble in water or can be rinsed with water, the method has an advantage in that no drying process is required in the step of cleaning and, therefore, the whole process can be simplified.

In the method for cleaning a sintered silicon carbide in a wet condition of the present invention, the step of cleaning a sintered silicon carbide described above comprises a step of dipping a sintered silicon carbide (occasionally referred to as a material to be cleaned, hereinafter) into a quasi-aqueous organic solvent, a step of dipping the material to be cleaned into an aqueous solution of an inorganic acid and a step of dipping the material to be cleaned into pure water, successively. When these steps are successively applied, organic substances on the surface such as oil film, finger prints and waxes are removed with the quasi-aqueous organic solvent, and next metal elements on the surface and in the vicinity of the surface are removed with the aqueous solution of an inorganic acid. It is preferable that a step of dipping the material to be cleaned into an aqueous solution of an ammonium compound is conducted between the above steps to facilitate removal of the organic solvent used and particles.

The step of dipping into a quasi-aqueous organic solvent is conducted to remove organic substances on the surface and in the vicinity of the surface of the sintered silicon carbide.

The quasi-aqueous organic solvent means a solvent which is soluble in water or a solvent which can be removed easily by washing with water although the solvent itself is insoluble in water. Examples of the quasi-aqueous organic solvent used in the present invention include a solvent soluble in water, a solvent obtained by partially introducing hydrophilic groups into a solvent insoluble in water or a solvent obtained by adding surfactants to a solvent insoluble in water in advance. Specific examples of the quasi-aqueous organic solvent include petroleum hydrocarbons, esters of organic acids, glycol ethers, mixed solvents of these solvents, mixtures of the solvent and a surfactant(s) and mixtures of the mixed solvents and a surfactant(s). Examples of the mixed solvent and the mixture include mixed solvents of petroleum hydrocarbons and esters of organic acid or glycol ethers, mixtures of surfactants, petroleum hydrocarbons and esters of organic acids or glycol ethers, mixtures of surfactants and petroleum hydrocarbons, and mixtures of surfactants and esters of organic acids.

Examples of the petroleum hydrocarbon include aliphatic hydrocarbons such as naphthenes and hexane.

Examples of the ester of organic acid include esters of fatty acids such as esters of methyl fatty acids, glycerol esters and sorbitan esters.

Examples of the glycol ether include propylene glycol ether, propylene glycol methyl ether and diethylene glycol dimethyl ether.

The surfactant is not particularly limited as long as the surfactant exhibits the desired effect. Preferable examples of the surfactant include nonionic surfactants such as polyoxyethylene methyl fatty acids, alkylamine oxides, polyoxyalkylene glycols and addition products of ethylene oxide or propylene oxide to alkylamines.

In the above step of dipping into a quasi-aqueous organic solvent, the sintered silicon carbide is preferably dipped for 2 to 60 minutes, more preferably 10 to 30 minutes and most preferably 10 to 15 minutes, although the time period is different depending on the amount and the type of the attached organic substances.

In the step of dipping into the quasi-aqueous organic solvent, it is effective that the treatment is conducted under heating at 50 to 70° C. from the standpoint of enhancing the ability to dissolve the attached organic substances.

The step of dipping into the aqueous solution of an inorganic acid is conducted to remove metal impurities on the surface and in the vicinity of the surface of the sintered silicon carbide.

Examples of the aqueous solution of an inorganic acid include an aqueous solution of hydrofluoric acid, an aqueous solution of nitric acid, an aqueous solution of sulfuric acid, an aqueous solution of hydrochloric acid, and aqueous solutions of mixtures thereof. Examples of the aqueous solution of the mixtures include an aqueous mixture of hydrofluoric acid and nitric acid, aqueous solutions of mixtures of hydrofluoric acid, nitric acid and sulfuric acid, and aqueous solutions of mixtures of hydrofluoric acid and hydrochloric acid.

The concentration of the aqueous solution of an inorganic acid is preferably 0.3 to 68% by weight, more preferably 1 to 40% by weight and most preferably 5 to 10% by weight. When the concentration is less than 0.3% by weight, the effect of removing metal impurities is occasionally insufficient. When the concentration exceeds 68% by weight, the surface of the material to be cleaned becomes occasionally rough.

To the above aqueous solution of an inorganic acid, a nonionic surfactant may be added so that metal ions dissolved into the solution are prevented from becoming attached to the material to be cleaned again. Examples of the nonionic surfactant include the same surfactants described above.

In the step of dipping into the aqueous solution of an inorganic acid, the sintered silicon carbide is preferably dipped for 5 to 120 minutes, more preferably 10 to 60 minutes and most preferably 20 to 30 minutes.

The step of dipping into pure water is conducted to remove components which are derived from the solvents and the aqueous solutions used in the previous steps in the step of cleaning and are left remaining on the surface and in the vicinity of the surface of the sintered silicon carbide.

As the pure water, water having an impurity level of 100 ppt or less and a specific resistance of 16 to 18 Ω is preferable and water having an impurity level of less than 10 ppt is more preferable.

In the step of dipping into pure water, it is preferable that an overflow process is used so that the material to be cleaned is always washed with fresh water.

The step of dipping into the aqueous solution of an ammonium compound is conducted to remove the organic solvents used in previous steps by the surface activity effect of the aqueous solution of an ammonium compound, and to remove particles. The organic solvents are considered to be left remaining on the surface and in the vicinity of the surface of the sintered silicon carbide in small amounts.

Examples of the aqueous solution of an ammonium compound include aqueous solutions of addition polymers of ethylene oxide or propylene oxide, such as alkylamine oxides or alkylamines, aqueous solutions of quaternary ammonium salts such as tetraalkylammonium halides (for example, tetramethylammonium halides) and tetraalkylammonium perchlorate, aqueous ammonia, mixtures of these aqueous solutions and an aqueous solution of hydrogen peroxide. Among these aqueous solutions of an ammonium compound, the aqueous solutions of quaternary ammonium salts such as tetraalkylammonium halides or tetraalkylammonium perchlorate, the aqueous ammonia and mixtures of these aqueous solutions and an aqueous solution of hydrogen peroxide are preferable.

An aqueous solution of an ammonium compound having a surface tension of 25 to 35 dyne/cm is favorably used although the preferable surface tension is different depending on the type of the solution.

A single type or a combination of two or more types of the aqueous solution of an ammonium compound may be used.

In the step of dipping into the aqueous solution of an ammonium compound, the sintered silicon carbide is preferably dipped for 5 to 120 minutes, more preferably 10 to 60 minutes and most preferably 20 to 30 minutes.

In the method for cleaning a sintered silicon carbide in the wet condition of the present invention, it is preferable that at least one of the above steps is conducted while ultrasonic vibration is applied to the aqueous solution so that dissolution of impurities at the surface and in the vicinity of the surface is promoted by the physical vibration applied to the material to be cleaned. The ultrasonic vibration may be applied while the material to be cleaned is vibrated or may be applied with sweeping of the frequency of the ultrasonic vibration. Applying the ultrasonic vibration in the step of dipping into the aqueous solution of an inorganic acid is effective.

In the method for cleaning a sintered silicon carbide in a wet condition of the present invention, the temperature of the solvent or the aqueous solution in at least one of the above steps is adjusted to be preferably 30° C. or more, more preferably 40° C. or more and most preferably 50° C. or more to enhance the ability of the solvent or the aqueous solution to dissolve unpreferable impurities and attached substances. The maximum value of the above temperature is at or lower than the boiling point of the solvent or the aqueous solution used. Carrying out this adjustment of the temperature in the step of dipping into the quasi-aqueous organic solvent is effective.

In the method for cleaning a sintered silicon carbide in a wet condition of the present invention, a step of dipping into cleaning water may be conducted between the above steps. When the step of dipping into cleaning water is conducted, for example, after the step of dipping into the quasi-aqueous organic solvent, contamination of the aqueous solution in the next step can be prevented by simply washing and removing the solvent attached to the material to be cleaned.

As the above cleaning water, pure water described above, distilled water or ion-exchanged water can be used. Pure water described above is preferable from the standpoint of preventing contamination of the material to be cleaned by the cleaning water in the step of dipping into cleaning water.

In the step of dipping into cleaning water described above, the sintered silicon carbide is preferably dipped for 2 to 60 minutes, more preferably 5 to 30 minutes and most preferably 10 to 20 minutes.

In the step of dipping into cleaning water, an overflow process may be used so that material to be cleaned is always washed with fresh water.

It is preferable that the apparatuses and instruments used in the step of cleaning a sintered silicon carbide described above are made of polyvinyl chloride having excellent chemical resistance and more preferably made of polyvinyl chloride treated for a high purity. It is also preferable that the apparatus for generating ultrasonic vibration and heaters are coated with Teflon on the surface.

The sintered silicon carbide obtained in accordance with the method for cleaning a sintered silicon carbide in a wet condition of the present invention and the sintered silicon carbide of the present invention obtained in accordance with the method comprising the step of preparation of the sintered silicon carbide described above and the step of cleaning the sintered silicon carbide described above have a high density and only small amounts of impurities on the surface and in the vicinity of the surface and are advantageously used for various parts of semiconductors and electronic parts. Examples of the parts of semiconductors include parts which are required to have a high purity and to be free from particles such as dummy wafers, heaters, electrodes for plasma etching and targets in ion injection apparatuses.

EXAMPLES

The present invention will be described more specifically with reference to examples in the following. However, the present invention is not limited to the examples.

Example 1

(Preparation of a sintered silicon carbide)

A phenol resin of the resol type containing an amine (amount of residual carbon after heat decomposition: 50%) in an amount of 6 g, and 94 g of a high purity n-type β-silicon carbide powder, which had an average particle diameter of 0.5 mm and one maximum value in distribution of the particle size, were mixed into 50 g of ethanol or acetone as the solvent using a wet type ball mill, and the obtained mixture was dried and molded into a cylindrical shape having a diameter of 20 mm and a thickness of 10 mm. Amounts of the phenol resin and the amine contained in the molded material were 6% by weight and 0.1% by weight, respectively. The molded material was sintered at a pressure of 700 kgf/cm$^2$ and at the temperature of 2,300° C. in an atmosphere of argon for 3 hours in accordance with the hot press method to obtain a sintered silicon carbide.

(Working of the sintered silicon carbide)

The obtained sintered silicon carbide was worked to prepare a flat plate of 40 mm×40 mm×2 mmt. One face of the formed plate was polished to form a rough surface and the other face was polished to form a mirror finished surface. The sintered silicon carbide obtained after the working showed a surface cleanliness (the amount of attached impurities) of $1\times10^{13}$ to $1\times10^{16}$ atoms/cm$^2$. The density of the obtained sintered silicon carbide was 3.13 g/cm$^3$ as measured in accordance with the method of Japanese Industrial Standard R1634. The total content of impurities was 3.5 ppm as measured in accordance with the analysis using an ICP-MS or a like apparatus. The total content of impurities did not include the impurities on the surface and in the vicinity of the surface.

(Cleaning of the sintered silicon carbide)

The sintered silicon carbide obtained after the working was dipped into a quasi-aqueous organic solvent (a mixed solvent containing a petroleum hydrocarbon, an ester of an organic acid and a nonionic surfactant; not diluted) at 50° C. for 15 minutes while ultrasonic vibration (100V–26±2 kHz) was applied, rinsed with water, dipped into an aqueous mixture of hydrofluoric acid and nitric acid (38% hydrofluoric acid:68% nitric acid:water=1:1:20) for 30 minutes and then dipped into pure water to obtain a sintered silicon carbide of Example 1.

(Evaluation)

The surface cleanliness (the amounts of impurities) of the obtained sintered silicon carbide of Example 1 was measured and found to be $8\times10^9$ to $1\times10^{11}$ atoms/cm$^2$. The results are shown in Table 1 in more detail. In all of the above treatments except the treatment of dipping into the quasi-aqueous organic solvent, the temperature of the aqueous solutions was kept at the room temperature. The surface cleanliness was measured in accordance with the following method.

(Measurement of the surface cleanliness (the amounts of impurities))

The surface cleanliness (the amounts of impurities) was measured as follows: to obtain the amounts of light elements (B, Na and Al), the surface of the sintered silicon carbide was washed with an aqueous solution containing 1% each of hydrofluoric acid and nitric acid to extract the impurities and the obtained aqueous solution was analyzed using an ICP-MS (Inductively Coupled Plasma Mass Spectrometer); and to obtain the amounts of other elements, the sintered silicon carbide was dipped into pure water, dried and then analyzed using a TXRF (Total Reflection X-Ray Fluorescencemeter).

In the analysis using the TXRF, a relative sensitivity coefficient based on silicon was used. It was confirmed in the analyses of K, Cr, Fe, Ni, Cu and Zn that the analysis using an ICP-MS and the analysis using a TXRF gave approximately the same results.

Example 2

The same procedures as those conducted in Example 1 were conducted except that, in place of being cleaned in accordance with the procedures conducted in Example 1, the sintered silicon carbide obtained after the working was dipped into glycol ether for 20 minutes, dipped into an aqueous solution of a quaternary ammonium salt for 30 minutes, dipped into an aqueous mixture of hydrofluoric acid and nitric acid (38% hydrofluoric acid: 68% nitric acid:water=1:1:20) for 30 minutes and then dipped into pure water and a sintered silicon carbide of Example 2 was obtained.

(Evaluation)

The surface cleanliness of the obtained sintered silicon carbide of Example 2 was measured and found to be $8\times10^9$ to $9\times10^{10}$ atoms/cm$^2$. The results are shown in Table 1 in more detail. In the above treatments, the temperature of the solvent and the aqueous solutions was kept at the room temperature.

Example 3

The same procedures as those conducted in Example 1 were conducted except that the ultrasonic vibration (100V–26±2 kHz) was applied in every step of cleaning the sintered silicon carbide and a sintered silicon carbide of Example 3 was obtained.

(Evaluation)

The surface cleanliness of the obtained sintered silicon carbide of Example 3 was measured and found to be $8\times10^9$ to $9\times10^{10}$ atoms/cm$^2$. The results are shown in Table 1 in more detail.

Example 4

The same procedures as those conducted in Example 1 were conducted except that the temperature of the solvent and the aqueous solution was adjusted at 70° C. in the step of cleaning the sintered silicon carbide and a sintered silicon carbide of Example 4 was obtained.

(Evaluation)

The surface cleanliness of the obtained sintered silicon carbide of Example 4 was measured and found to be $8\times10^9$ to less than $1\times10^{11}$ atoms/cm$^2$. The results are shown in Table 1 in more detail.

Example 5

The same procedures as those conducted in Example 1 were conducted except that, in place of being cleaned in accordance with the procedures conducted in Example 1, the sintered silicon carbide obtained after the working was dipped into a quasi-aqueous organic solvent (a mixed solvent containing a petroleum hydrocarbon, an ester of an organic acid and a nonionic surfactant; not diluted) at 50° C. for 15 minutes while ultrasonic vibration (100V–26±2 kHz) was applied, dipped into an aqueous solution of a quaternary ammonium salt for 30 minutes, dipped into an aqueous solution of a mixture of hydrofluoric acid, nitric acid and sulfuric acid (38% hydrofluoric acid:68% nitric acid:98% sulfuric acid: water=1:1:1:20) for 30 minutes and then dipped into pure water and a sintered silicon carbide of Example 5 was obtained. The temperature of the aqueous solutions was kept at the room temperature in the above treatments except for the treatment of dipping into the quasi-aqueous organic solvent.

(Evaluation)

The surface cleanliness of the obtained sintered silicon carbide of Example 5 was measured and found to be $4 \times 10^9$ to less than $9 \times 10^{10}$ atoms/cm$^2$. The obtained values of the analyses of Zn and Cr were the values at the lower limit of the detectable range of TXRF. The results are shown in Table 1 in more detail.

Comparative Example 1

The same procedures as those conducted in Example 1 were conducted except that the sintered silicon carbide was not dipped into the aqueous mixture of hydrofluoric acid and nitric acid in the step of cleaning the sintered silicon carbide and a sintered silicon carbide of Comparative Example 1 was obtained.

(Evaluation)

The surface cleanliness of the obtained sintered silicon carbide of Comparative Example 1 was measured and found to be $1 \times 10^{11}$ to less than $1 \times 10^{15}$ atoms/cm$^2$. The results are shown in Table 1 in more detail.

Comparative Example 2

The same procedures as those conducted in Example 1 were conducted except that the sintered silicon carbide was not dipped into the quasi-aqueous organic solvent in the step of cleaning the sintered silicon carbide and a sintered silicon carbide of Comparative Example 2 was obtained.

(Evaluation)

The surface cleanliness of the obtained sintered silicon carbide of Comparative Example 2 was measured and found to be $1 \times 10^{10}$ to less than $1 \times 10^{14}$ atoms/cm$^2$. The results are shown in Table 1 in more detail.

TABLE 1

| Impurity | not cleaned | Example |   |   |   |   | Comparative Example |   |
|---|---|---|---|---|---|---|---|---|
|  |  | 1 | 2 | 3 | 4 | 5 | 1 | 2 |
| B  | 1050   | 4.6 | 5.2 | 8.0 | 7.0  | 8.3 | 88.5   | 50.2   |
| Na | 7260   | 7.8 | 8.0 | 1.6 | 2.1  | 6.5 | 15.9   | 13.6   |
| Al | 1250   | 8.8 | 7.6 | 8.3 | 9.5  | 1.2 | 756.0  | 64.5   |
| K  | 65800  | 0.8 | 0.8 | 0.8 | 0.8  | 0.4 | 12.2   | 11.0   |
| Ca | 14500  | 8.0 | 8.0 | 6.0 | 7.2  | 5.0 | 18.3   | 15.7   |
| Cr | 8450   | 3.0 | 2.6 | 0.8 | 1.2  | 1.0 | 1620.0 | 13.6   |
| Fe | 24320  | 8.1 | 9.0 | 1.3 | 2.1  | 9.0 | 9295.0 | 1260.0 |
| Ni | 67800  | 9.5 | 5.0 | 1.8 | 1.8  | 1.9 | 1740.0 | 42.5   |
| Cu | 148400 | 7.1 | 6.5 | 1.5 | 1.9  | 4.7 | 32650.0| 324.0  |
| Zn | 2400   | 1.2 | 1.5 | 0.8 | (*1) | 0.6 | 20.5   | 6.5    |

Note:
The unit of the numbers in the Table 1: $\times 10^{10}$ atoms/cm$^2$
(*1): $8 \times 10^9$ to $8 \times 10^{10}$ The results of Examples 1 to 5 and Comparative Examples 1 and 2 show that the sintered silicon carbide of the present invention had a surface cleanliness at a level smaller than $1 \times 10^{11}$ atoms/cm$^2$, a high density and a high purity. A sintered silicon carbide having surface cleanliness of this level can be applied to various parts of semiconductors and electronic parts.

It is shown by the results in Table 1 that the sintered silicon carbide which was treated by cleaning in a wet condition of the present invention had a surface cleanliness smaller than $1 \times 10^1$ atoms/cm$^2$ and can be applied to various parts of semiconductors and electronic parts. The results obtained in Example 5 show a remarkable effect of the combined use of sulfuric acid on the removal of aluminum.

As described above, the present invention can provide a sintered silicon carbide having a high density, with small amounts of organic and inorganic impurities present on the surface and in the vicinity of the surface.

Moreover, the present invention can provide a method for cleaning a sintered silicon carbide in a wet condition in accordance with which organic and inorganic impurities present on the surface and in the vicinity of the surface of the sintered silicon carbide can be removed easily.

What is claimed is that:

1. A method for cleaning a sintered silicon carbide in a wet condition, comprising the steps of:
   (a) dipping the sintered silicon carbide into a quasi-aqueous, organic solvent;
   (b) then dipping the sintered silicon carbide into an aqueous solution of an inorganic acid; and
   (c) then dipping the sintered silicon carbide into pure water.

2. The method according to claim 1, wherein at least one of steps (a)–(c) is conducted while ultrasonic vibration is applied to a liquid.

3. A method according to claim 1, wherein the temperature of a liquid in at least one of steps (a)–(c) is 30° C. or more.

4. The method according to claim 1, wherein the quasi-aqueous organic solvent is selected from the group consisting of petroleum hydrocarbons, esters of an organic acid, glycol ethers, a mixed solvent thereof, a mixture of a surfactant and the solvent, and a mixture of a surfactant and the mixed solvent.

5. The method according to claim 1, wherein the aqueous solution of an inorganic acid is selected from the group consisting of an aqueous solution of hydrofluoric acid, an aqueous solution of nitric acid, an aqueous solution of sulfuric acid, an aqueous solution of hydrochloric acid, and an aqueous solution of mixtures thereof.

6. A method for cleaning a sintered silicon carbide in a wet condition, comprising the steps of:
   (a) dipping the sintered silicon carbide into a quasi-aqueous aqueous organic solvent;
   (b) then dipping the sintered silicon carbide into an aqueous solution of an ammonium compound;
   (c) then dipping the sintered silicon carbide into an aqueous solution of an inorganic acid; and
   (d) then dipping the sintered silicon carbide into pure water.

7. The method according to claim 6, wherein at least one of steps (a)–(d) is conducted while ultrasonic vibration is applied to a liquid.

8. The method according to claim 6, wherein the temperature of a liquid in at least one of steps (a)–(d) is 30° C. or more.

9. The method according to claim 6, wherein the quasi-aqueous organic solvent is selected from the group consisting of petroleum hydrocarbons, esters of an organic acid, glycol ethers, a mixed solvent thereof, a mixture of a surfactant and the solvent, and a mixture of a surfactant and the mixed solvent.

10. The method according to claim 6, wherein the aqueous solution of an inorganic acid is selected from the group consisting of an aqueous solution of hydrofluoric acid, an aqueous solution of nitric acid, an aqueous solution of sulfuric acid, an aqueous solution of hydrochloric acid, and an aqueous solution of mixtures thereof.

11. The method according to claim 6, wherein the aqueous solution of an ammonium compound is selected from the group consisting of an aqueous solution of a tetraalkylammonium halide, an aqueous solution of a tetraalkylammonium perchlorate, aqueous ammonia, and mixtures of the aqueous solution with an aqueous solution of hydrogen peroxide.

12. A method for cleaning a sintered silicon carbide in a wet condition, comprising the steps of:

(a) dipping the sintered silicon carbide into a quasi-aqueous organic solvent;

(b) then dipping the sintered silicon carbide into an aqueous solution of an inorganic acid;

(c) then dipping the sintered silicon carbide into an aqueous solution of an ammonium compound; and (d) then dipping the sintered silicon carbide into pure water.

13. A method according to claim 12, wherein at least one of steps (a)–(d) is conducted while ultrasonic vibration is applied to a liquid.

14. The method according to claim 12, wherein the temperature of a liquid in at least one of the steps (a)–(d) is 30° C. or more.

15. The method according to claim 12, wherein the quasi-aqueous organic solvent is selected from the group consisting of petroleum hydrocarbons, esters of an organic acid, glycol ethers, a mixed solvent thereof, a mixture of a surfactant and the solvent, and a mixture of a surfactant and the mixed solvent.

16. The method according to claim 12, wherein the aqueous solution of an inorganic acid is selected from the group consisting of an aqueous solution of hydrofluoric acid, an aqueous solution of nitric acid, an aqueous solution of sulfuric acid, an aqueous solution of hydrochloric acid, and an aqueous solution of mixtures thereof.

17. The method according to claim 12, wherein the aqueous solution of an ammonium compound is selected from the group consisting of an aqueous solution of a tetraalkylammonium halide, an aqueous solution of a tetraalkylammonium perchlorate, aqueous ammonia, and mixtures of the aqueous solution with an aqueous solution of hydrogen peroxide.

18. The method according to claim 12, wherein the pure water has an impurity level not greater than 100 ppt and a specific resistance of from 16 to 18 $\Omega$.

19. The method according to claim 6, wherein the pure water has an impurity level not greater than 100 ppt and a specific resistance of from 16 to 18 $\Omega$.

20. The method according to claim 1, wherein the pure water has an impurity level not greater than 100 ppt and a specific resistance of from 16 to 18 $\Omega$.

* * * * *